US009678731B2

(12) United States Patent
Hassine et al.

(10) Patent No.: US 9,678,731 B2
(45) Date of Patent: Jun. 13, 2017

(54) METHODS AND APPARATUS TO GENERATE A CUSTOMIZED APPLICATION BLUEPRINT

(71) Applicant: VMware, Inc., Palo Alto, CA (US)

(72) Inventors: Lital Hassine, Nes Ziona (IL); Asaf Kariv, Tel Mond (IL); Avshi Avital, Sde Warburg (IL)

(73) Assignee: VMware, Inc., Palo Alto, CA (US)

( * ) Notice: Subject to any disclaimer, the term of this patent is extended or adjusted under 35 U.S.C. 154(b) by 186 days.

(21) Appl. No.: 14/191,020

(22) Filed: Feb. 26, 2014

(65) Prior Publication Data

US 2015/0242204 A1 Aug. 27, 2015

(51) Int. Cl.
*G06F 9/445* (2006.01)
*G06F 9/44* (2006.01)
*H04L 12/24* (2006.01)

(52) U.S. Cl.
CPC ............ *G06F 8/60* (2013.01); *H04L 41/0843* (2013.01); *G06F 8/61* (2013.01); *G06F 8/71* (2013.01); *H04L 41/08* (2013.01)

(58) Field of Classification Search
CPC ..... G06F 8/60; G06F 8/61; G06F 8/71; H04L 41/08; H04L 41/0843
See application file for complete search history.

(56) References Cited

U.S. PATENT DOCUMENTS

| | | | |
|---|---|---|---|
| 6,708,215 B1 * | 3/2004 | Hingorani et al. | 709/229 |
| 7,082,464 B2 * | 7/2006 | Hasan | H04L 41/0213 |
| | | | 709/202 |
| 7,805,419 B2 | 9/2010 | Newman | |
| 7,930,381 B2 * | 4/2011 | Attanasio et al. | 709/223 |
| 8,209,687 B2 | 6/2012 | Yuyitung et al. | |
| 8,285,929 B2 * | 10/2012 | Kaneko | G06F 3/061 |
| | | | 711/114 |
| 8,448,170 B2 | 5/2013 | Wipfel et al. | |
| 8,620,851 B2 | 12/2013 | Brown et al. | |
| 8,650,562 B2 | 2/2014 | Hou et al. | |
| 8,789,022 B2 | 7/2014 | Neogi | |
| 8,826,274 B2 | 9/2014 | Moriki et al. | |
| 8,874,704 B2 * | 10/2014 | Nath et al. | 709/220 |
| 8,914,768 B2 | 12/2014 | Karnik et al. | |
| 9,003,406 B1 | 4/2015 | Hodge et al. | |

(Continued)

FOREIGN PATENT DOCUMENTS

EP 2369479 9/2011
EP 2562973 2/2013

OTHER PUBLICATIONS

García-Gómez, S. et al., 4CaaSt: Comprehensive management of Cloud services through a PaaS, 2012 IEEE 10th International Symposium on Parallel and Distributed Processing with Applications (ISPA), Jul. 2012, 6 pages, [retrieved on Feb. 3, 2017], Retrieved from the Internet: <URL:http://ieeexplore.ieee.org/>.*

(Continued)

*Primary Examiner* — Geoffrey St Leger

(57) ABSTRACT

Methods and apparatus to generate a customized application blueprint are disclosed. An example method includes determining a first computing unit within an application definition, identifying a property for the first computing unit, and generating an application blueprint based on the identified property of the computing unit.

22 Claims, 9 Drawing Sheets

(56) References Cited

U.S. PATENT DOCUMENTS

| | | | |
|---|---|---|---|
| 9,015,712 B1 | 4/2015 | Hodge et al. | |
| 9,043,786 B1 | 5/2015 | Hodge et al. | |
| 9,047,133 B2 | 6/2015 | Winterfeldt et al. | |
| 9,052,961 B2 | 6/2015 | Mangtani et al. | |
| 9,086,917 B1* | 7/2015 | Fitzgerald | G06F 8/60 |
| 9,237,060 B2* | 1/2016 | Wu | H04L 29/12952 |
| 2003/0028624 A1 | 2/2003 | Hasan | H04L 41/0213 709/220 |
| 2005/0080811 A1* | 4/2005 | Speeter | H04L 67/10 |
| 2005/0177829 A1* | 8/2005 | Vishwanath | G06F 8/61 717/177 |
| 2005/0198629 A1* | 9/2005 | Vishwanath | G06F 8/61 717/174 |
| 2005/0203921 A1 | 9/2005 | Newman et al. | |
| 2006/0149408 A1* | 7/2006 | Speeter | G06F 8/71 700/126 |
| 2008/0133972 A1 | 6/2008 | Verbowski et al. | |
| 2008/0134175 A1 | 6/2008 | Fitzgerald et al. | |
| 2008/0201701 A1* | 8/2008 | Hofhansl | G06F 8/60 717/168 |
| 2009/0144420 A1* | 6/2009 | Attanasio et al. | 709/224 |
| 2009/0265707 A1 | 10/2009 | Goodman et al. | |
| 2010/0070725 A1 | 3/2010 | Prahlad et al. | |
| 2011/0060878 A1* | 3/2011 | Kaneko | G06F 3/061 711/114 |
| 2011/0126207 A1 | 5/2011 | Wipfel et al. | |
| 2011/0307617 A1* | 12/2011 | Wu | H04L 29/12952 709/228 |
| 2012/0066487 A1 | 3/2012 | Brown et al. | |
| 2012/0284713 A1 | 11/2012 | Ostermeyer et al. | |
| 2012/0331388 A1 | 12/2012 | Nedelcu et al. | |
| 2013/0219363 A1 | 8/2013 | Wu et al. | |
| 2013/0283102 A1 | 10/2013 | Krajec et al. | |
| 2013/0283263 A1 | 10/2013 | Elemary | |
| 2014/0019597 A1* | 1/2014 | Nath et al. | 709/220 |
| 2014/0040656 A1 | 2/2014 | Ho et al. | |
| 2014/0109078 A1* | 4/2014 | Lang | G06F 8/52 717/172 |
| 2014/0237472 A1 | 8/2014 | Adogla et al. | |
| 2014/0373011 A1* | 12/2014 | Anderson | G06F 9/45533 718/1 |
| 2014/0380308 A1 | 12/2014 | Hassine et al. | |
| 2015/0006687 A1* | 1/2015 | Baskwill | H04L 41/0843 709/221 |
| 2015/0058461 A1* | 2/2015 | Guiditta | H04L 41/0843 709/223 |
| 2015/0154039 A1 | 6/2015 | Zada et al. | |

OTHER PUBLICATIONS

García-Gómez, S. et al., Challenges for the Comprehensive Management of Cloud Services in a PaaS Framework, Scalable Computing: Practice and Experience, vol. 13, No. 3, 2012, pp. 201-213, [retrieved on Feb. 3, 2017], Retrieved from the Internet: <URL:https://scpe.org/index.php/scpe/article/download/793/357>.*

"Using VMware vFabric Application Director", VMware, Inc., vFabric Application Director 5.0, 2012 (164 pages).

"vCloud Director User's Guide", VMware, Inc., vCloud Director 5.1, 2010-2012 (126 pages).

"Infrastructure Navigator User's Guide", VMware, Inc., vCenter Infrastructure Navigator 2.0.0, 2012-2013 (38 pages).

Puppet Labs, "What is a Puppet?"<http://info.puppetlabs.com/download-pe.html>, 2014 (4 pages).

Puppet Labs, "Puppet Enterprise", <http://info.puppetlabs.com/download-pe.html>, 2014 (4 pages).

White Paper: "A Blueprint for Better Management from the Desktop to the Data Center", Feb. 2007, Novell, Inc., 17 pages.

Hu et al., "JAVA Blueprint Procedure Pattern", 2013 IEEE, 5 pages.

United States Patent and Trademark Office, "Non-Final Office Action," issued in connection with U.S. Appl. No. 13/926,813, Jun. 18, 2015, 28 pages.

Mitchell, Dan, "DynamicOps Cloud Development Kit: Overview and Concepts: Extending Your Cloud to New Use Cases," DynamicOps.com, Jun. 2012, 12 pages.

Bourdeau, Rich, "DynamicOps Extensibility Overview: Enable, Adapt, and Extend your Infrastructure into a Business Relevant Cloud," DynamicOps.com, May 2012, 12 pages.

VMware, "vCloud Automation Center Introduced by VMware: vCloud Automation Center—leverages vCD to provision applications to virtual datacenters," retrieved from the internet on Nov. 30, 2012, 7 pages.

Dynamicops, "DynamicOps Cloud Automation Center Design Center Datasheet," DynamicOps.com, Apr. 12, 2011, webpage and linked datasheet, [retrieved on Mar. 27, 2014 at http://www.dabcc.com/article.aspx?id=17668], 6 pages.

VMware, "VMware vCenter Infrastructure Navigator," 2013, 1 page.

VMware, "VMware vFabric™ Application Director," 2013, 2 pages.

vFABRIC Documentation Center, "Introduction to Hyperic Monitoring," vFabric Hyperic Overview, retrieved May 12, 2014, retrieved from http://pubs.vmware.com/vfabric5/index.jsp?topic=/com.vmware.vfabric.hyperic.4.6/Introduction_to_Hyperic_Monitoring.html (3 pages).

Subhasish Bhattacharya, "Clustering and High-Availability", 2012, MSDN blogs, including sections, How to configure VM Monitoring in Windows Server 2012, and VM Monitoring in Windows Server 2012—Frequently Asked Questions, 8 pages.

Microsoft, "TechNet Library", Oct. 2013, including sections, Add-ClusterVMMonitoredItem, Get-CiusterVMMonitoredItem, and Remove-CiusterVMMonitoredItem, retrieved from http://web.archive.org/web/20131111124419/http://technet.microsoft.com/enus/library, 11 pages.

IBM, "Tivoli IM Tiboli Monitoring for Virtual Servers: Vmware BI Agent," version 6.2.1, 2009, International Business Machines Corporation, 207 pages.

* cited by examiner

METHODS AND APPARATUS TO GENERATE A CUSTOMIZED APPLICATION BLUEPRINT

FIELD OF THE DISCLOSURE

This disclosure relates generally to cloud computing and, more particularly, to methods and apparatus to generate a customized application blueprint.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

However, current deployment tools are often process-driven with heavy reliance on custom scripts and property files. Additionally, these tools often heavily utilize network bandwidth through continuous polling for readiness of execution or rely on a centralized mechanism that causes a central point of resource contention. Traditional deployment tools are also not configured for automation with cloud computing platforms that dynamically provision virtual computing resources.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
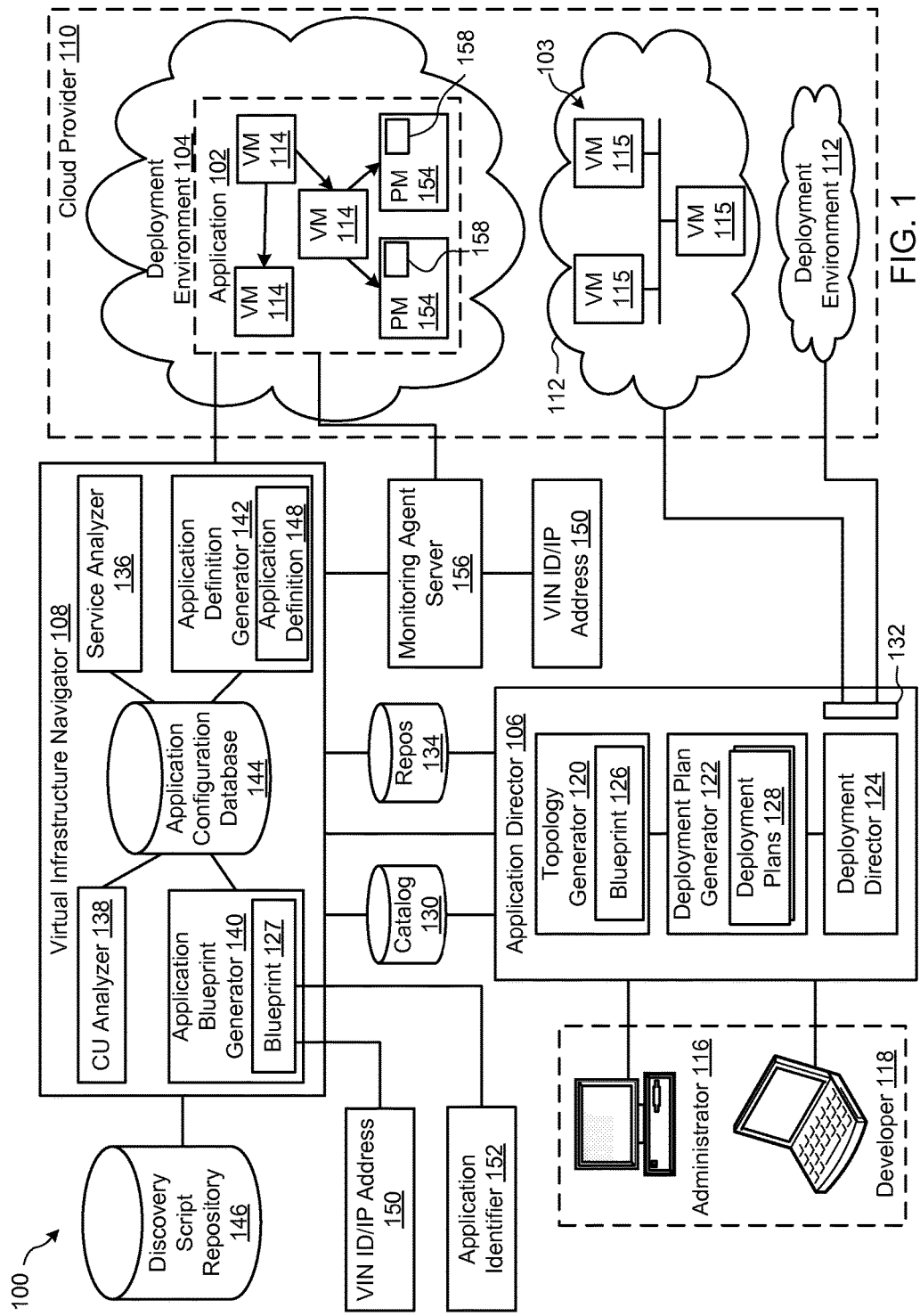
FIG. 1 depicts an example system constructed in accordance with the teachings of this disclosure for generating a customized application blueprint based on a deployed application.

Many IT groups now have the need to move their traditional data centers and/or web applications to the cloud. The cloud can be private, public or hybrid. In order to do so they need to transfer multi-tier applications with a specific configuration to the cloud. The virtual infrastructure administrators are often not aware of all the configuration details that need to be customized or how to configure the applications components to work together.

Some applications (e.g., multi-machine applications) are composed of mixtures of out-of-the-box (e.g., standard) components, such as software objects. The out-of-the-box components may be configured to interface with each other, with common or standard types of modifications being applied to the components to make the overall application function as desired by the developer. In contrast, some multi-machine applications and/or portions of multi-machine applications require specialized modifications to the application components, interfaces, physical machines, and/or virtual machines (VMs) hosting or implementing the application components (e.g., operating systems, virtual hardware, etc.).

While previous application management or lifecycle software may be capable of re-creating such customized configurations, the management or lifecycle software must be manually provided with the desired customizations and properties of the components included in the multi-machine application by a developer or administrator. Such manual provisioning of customizations limits the use of previous application management or lifecycle software to deployments of newly-defined applications and/or deployments of applications that must be manually re-created from a deployed application. Such re-creation results in a duplication of effort, is costly, and is subject to configuration errors and/or omissions of properties from the resources underlying the application, causing execution errors.

Example methods and apparatus disclosed herein facilitate the automatic conversion of unmanaged customized applications (e.g., multi-machine applications), implemented using multiple VMs and/or physical machines, to managed application deployments. Example applications described herein are multi-machine applications that are implemented using a combination of VMs and/or physical machines. Example methods and apparatus enable a deployed application to be imported to an application manager, such as vFabric Application Director, a commercially available product from VMware, Inc., from which the application can be managed. Example methods and apparatus use configuration discovery script(s) to scan deployed applications and/or application service packages. By scanning, example methods and apparatus disclosed herein identify customized application configuration properties of the application. Example methods and apparatus include the customized application configuration properties in the resulting application blueprint that describes the application. The application configuration properties are implemented upon deployment of the managed application based on the application blueprint.

Example methods and apparatus disclosed herein discover application properties by executing a discovery script via VM(s) and/or physical machine(s) implementing the application and/or by instructing monitoring agents on VM(s) and/or physical machine(s) implementing the application (e.g., included in the application definition for the application) to execute a discovery script to generate a discovery report. In some other examples, a monitoring agent server instructs monitoring agents on physical machines and/or VMs to execute a discovery script and/or parses discovery reports generated by the monitoring agents. For example, a VM may execute a discovery script to discover middleware settings stored in files, operating system registry keys, and/or any other source for implementing customized application configuration properties. Example customized application configuration properties include: dependencies between VMs and/or physical machines, services, and/or other application components in the application; node cluster definitions; load balancing; port configurations; ciphers; custom drivers; and/or limits on simultaneous executing threads. Such items are easily overlooked when manually reviewing an application component's configuration. However, the example discovery scripts disclosed herein may be additionally or alternatively used to discover any other customized application configuration properties.

Examples disclosed herein provide deployment systems for deploying a multi-tier application to a cloud computing environment. Some example deployment systems enable a developer or "application architect" to create customized "application blueprints" from currently running or deployed applications. The application blueprints define the structure of the application, enable the use of standardized application infrastructure components, and specify installation dependencies and default configurations. The application blueprints define the topology for deployment in an infrastructure-agnostic manner to be portable across different cloud computing environments.

Example methods disclosed herein include determining a first computing unit (CU) (e.g., virtual machine or physical machine) within an application definition, automatically identifying a property for the first CU, and generating an application blueprint based on the property of the first CU.

Example apparatus disclosed herein include a service analyzer to identify a first CU that is within an application definition, a CU analyzer to identify a property for the first CU, and an application blueprint generator to generate an application blueprint based on the property of the first CU.

As used herein, the term "computing unit" refers to a virtual machine (VM) and/or a physical machine.

As used herein, the term "application component" refers to code (e.g., custom code) that has been packaged according to a format (e.g., as an archive format such as an enterprise archive (e.g., .ear file), a web archive (e.g., .war file), etc.).

As used herein, the term "node" or "logical node" refers to a CU or a cluster of CUs defined in a blueprint.

As used herein, the term "cluster" refers to a collection of hosts that can be managed as a single entity. The resources from the hosts in a cluster may be aggregated into a single pool. A cluster appears as a stand-alone host, but typically has more resources available.

As used herein, the term "blueprint" refers to a logical topology of an application for deployment. A blueprint captures the structure of an application with logical nodes, their corresponding services and operating systems, dependencies, default configurations, and network topology requirements.

As used herein, the term "cloud provider" refers to a cloud instance for deployment.

As used herein, the term "deployment environment" refers to an environment in a cloud provider. A deployment environment may be used, for example, for development, testing, staging, and/or production. A cloud provider can have multiple deployment environments.

As used herein, the term "catalog" refers to a library that contains logical templates (e.g., pointers to cloud templates). Catalogs provide one or more reusable services that can be used in multiple applications and installed on a VM. Catalogs may also provide tasks that perform additional customized functions in an application deployment.

As used herein, the term "logical template" refers to a predefined VM definition. A logical template can be mapped to an actual template in a cloud catalog. Logical templates allow an application blueprint to remain cloud agnostic.

As used herein, the term "service" refers to scripted software that can be installed on a CU and reused in multiple applications.

As used herein, the term "properties" refers to configuration variables used by scripts to set parameters on a script and run various configurations. For example, setting an installation_path property value causes installation scripts to use the property to specify the path to use to install a service during an application deployment process.

FIG. 1 depicts an example system 100 for generating a customized application blueprint based on an unmanaged application 102 and constructed in accordance with the teachings of this disclosure. In the example of FIG. 1, the application 102 is a customized multi-tier application (e.g., modified from component templates) and is initially deployed in a deployment environment 104 in an unmanaged state (e.g., not managed via an application lifecycle package). The example system 100 includes an application director 106 and a virtual infrastructure navigator 108, which may be used to convert a customized application from an unmanaged state to a managed state (e.g., a managed application 103) and/or to manage applications as described in more detail below.

The example unmanaged application 102 is deployed in the deployment environment 104 provided by a cloud computing platform provider 110 (also referred to herein simply as a "cloud provider"). The example cloud computing platform provider 110 of FIG. 1 may include any number of deployment environments 104, 112.

The example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116 and/or the developer 118 may access services from the cloud computing platform provider 110, for example, via REST (Representational State Transfer) APIs (Application Programming Interface) and/or via any other client-server communication protocol. One particular implementation of a REST API for cloud computing services is vCloud Director API available from VMware, Inc. The example cloud computing platform provider 110 provisions virtual computing resources (e.g., the VMs 114) and/or physical resources to provide the deployment environments 112 in which the administrator 116 and/or developer 118 can deploy multi-tier application(s). One particular example of a deployment environment that may be used to implement the deployment environments 112 of FIG. 1 is vCloud DataCenter cloud computing services available from VMware, Inc.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a blueprint 126 that specifies a logical topology of an application to be deployed. The example application director 106 may also import a blueprint 127 from the example virtual infrastructure navigator 108 for deployment and/or management. The example blueprints 126, 127 generally capture the structure of an application as a collection of application components executing on virtual computing resources. For example, the blueprint 126 generated by the example topology generator 120 for an online store application may specify a web application (e.g., in the form of a Java web application archive or "WAR" file comprising dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, comprised of application packages and their dependent middleware and operating systems. Applications may be distributed across multiple CUs (e.g., one or more VMs, one or more physical machines, and/or a combination of one or more VMs and/or one or more physical machines). Thus, in the example described above, the term "application" refers to the entire online store application, including application server and database components, rather than just the web application itself.

The example blueprint 126 of FIG. 1 may be assembled from items (e.g., templates) from a catalog 130, which is a listing of available virtual computing resources (e.g., VMs, networking, storage) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT or system administrator) that enters in specifications, configurations, properties, and/or other details about items in the catalog 130. Based on the application, the example blueprints 126, 127 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the application director 106 generates a deployment plan 128 based on the blueprint 126, 127 that includes deployment settings for the blueprint 126, 127 (e.g., virtual computing resources' cluster size, CPU, memory, networks) and an execution plan of tasks having a specified order in which virtual computing resources are provisioned and application components are installed, configured, and started. The example deployment plan 128 provides an IT administrator with a process-oriented view of the blueprint 126, 127 that indicates discrete steps to be performed to deploy the application. Different deployment plans 128 may be generated from a single blueprint 126, 127 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 115 provisioned from the deployment environment 112. Each VM 115 coordinates execution of each task with a centralized deployment module (e.g., the deployment director 124) to ensure that tasks are executed in an order that complies with dependencies specified in the application blueprint 126, 127.

The example deployment director 124 of FIG. 1 executes the deployment plan 128 by communicating with the cloud computing platform provider 110 via a cloud interface 132 to provision and configure the VMs 115 in the deployment environment 112. The example cloud interface 132 provides a communication abstraction layer by which application director 106 may communicate with a heterogeneous mixture of cloud provider 110 and deployment environments 112. The deployment director 124 provides each VM 115 with a series of tasks specific to the receiving VM 115 (herein referred to as a "local deployment plan"). Tasks are executed by the VMs 115 to install, configure, and/or start one or more application components. For example, a task may be a script that, when executed by a VM 115, causes the VM 115 to retrieve and install particular software packages from a central package repository 134. The example deployment director 124 coordinates with the VMs 115 to execute the tasks in an order that observes installation dependencies between VMs 115 according to deployment plan 128. After the application has been deployed, the application director 106 may be utilized to monitor and/or modify (e.g., scale) the deployment.

The virtual infrastructure navigator 108 of FIG. 1 generates the example application blueprint 127 based on the deployed application 102, which may be imported to the example application director 106 to be deployed and/or managed. To generate the application blueprint 127, the example virtual infrastructure navigator 108 of FIG. 1 includes a service analyzer 136, a CU analyzer 138, an application blueprint generator 140, an application definition generator 142, and an application configuration database 144. The example virtual infrastructure navigator 108 of FIG. 1 is in communication with a discovery script repository 146.

The example service analyzer 136 of FIG. 1 identifies the VMs 114 that are within an application definition 148. In some examples, the service analyzer 136 analyzes an application service package to identify the VMs 114 (e.g., VM name, VM IP address, VM host resource(s), etc.). In some other examples, the application definition generator 142 generates the application definition based on scans of the VMs 114 by the service analyzer 136 based on a seed VM 114.

The example service analyzer 136 receives a VM identifier (e.g., the VIN ID/IP address 150, and/or the application identifier 152 of FIG. 1).

The example service analyzer 136 of FIG. 1 receives (e.g., from the administrator 116) a VM identifier (e.g., a VIN ID) and/or an IP address 150 of a currently-running VM 114, from which the service analyzer 136 may iteratively determine VMs belonging to the application 102. The example service analyzer 136 analyzes the VM identifier 150 to determine, for example, IP addresses and/or credentials for the VM(s) 114. Additionally or alternatively, the example service analyzer 136 may receive an application identifier 152 for the application 102, such as a unique application name and an identifier of the deployment environment 104 in which the application 102 is deployed. The example service analyzer 136 of FIG. 1 may be required to translate the discovered properties into logical locations (e.g., IP addresses, URLs, URIs, etc.) at which the CU analyzer 138 may access the VMs 114 to perform analysis. The example service analyzer 136 of FIG. 1 identifies the VMs 114 from the VM identifier by, for example, querying the cloud computing platform provider 110. The service analyzer 136 of the illustrated example stores identifiers of the VMs 114 included in the application 102 in the application configuration database 144.

As mentioned above, the example service analyzer 136 may analyze the VMs 114 to facilitate generation of the application definition 148. For example, the service analyzer 136 of the illustrated example may access and/or execute the discovery script(s) in the discovery script repository 146 to discover properties such as dependencies, node cluster definitions, and/or interfaces to other, unidentified ones of the VMs 114 in the application 102. The example service analyzer 136 adds the discovered ones of the VMs 114 to a list of VMs to be analyzed by the CU analyzer 138 and provides any relevant configuration items to the example application definition generator 142. The example application definition generator 142 generates the application definition 148 based on the configurations and/or properties resulting from the configurations.

In addition to the VMs 114, the example application 102 of FIG. 1 is at least partially implemented by physical machines 154. The VMs 114 and the physical machines 154 may be collectively and/or individually referred to herein as "computing units" or "CUs." As with the VMs 114, the example virtual infrastructure navigator 108 and the application director 106 of FIG. 1 may identify and process relevant configuration items of the physical machines 154 (as described in more detail below) to include representations of the physical machines 154 in an application blueprint for subsequent deployment in the deployment environment 112 (e.g., via the VMs 115 and/or via physical machines as part of the application 103).

To identify and process the configuration items in the example physical machines 154 of FIG. 1, the example system 100 includes a monitoring agent server 156. The example monitoring agent server 156 includes an interface accessible by the virtual infrastructure navigator 108 (e.g., to enable the virtual infrastructure navigator 108 to request and receive configuration information for the physical machines 154).

To collect configuration information for the physical machines 154, the example monitoring agent server 156 of FIG. 1 deploys monitoring agents 158 to the physical machines 154. The monitoring agents 158 have access to the low-level configuration information for the physical hardware, operating system, and/or any applications and/or services operating on the example physical machine 154. In some examples, the monitoring agents 158 are installed on the physical machines 154 during setup, runtime, and/or management of the application 102 prior to the virtual infrastructure navigator 108 identifying the CUs 114, 154 implementing the application 102.

The example monitoring agent server 156 and the example monitoring agents 158 may be implemented using, for example, Puppet Enterprise information technology automation software and/or VMware vFabric Hyperic management software. For example, the monitoring agents 158 may be implemented as Puppet nodes and the monitoring agent server 156 may be implemented as a Puppet Master server. The example Puppet Master controls the Puppet nodes and can provide custom discovery scripts for execution by the Puppet nodes. The example VMs 114 of FIG. 1 may additionally or alternatively be provided with monitoring agents 158 to execute corresponding discovery scripts. The example monitoring agents 158 execute discovery scripts to identify configurations of the nodes and generate discovery reports containing the identified configuration information. In some examples, discovery reports are formatted files containing configuration information discovered by the monitoring agent according to the discovery script. Example discovery scripts may search designated locations and/or types of locations on the CUs 114, 154 to determine, for example, whether particular configuration settings exist on the CU 114, 154, whether particular types or classes of configuration settings exist on the CU 114, 154, and/or to determine a configuration status of a configuration setting or type of configuration setting. The monitoring agents 158 and/or the monitoring agent server 156 provide the discovery reports to the example service analyzer 136, which parses the discovery reports to identify the CUs 114, 154 implementing the application 102.

In response to command(s) from the monitoring agent server 156, the example monitoring agents 158 execute a discovery script to identify configuration items for the physical machines 154. The monitoring agents 158 generate discovery reports based on the configuration items identified during execution of the discovery script and transmit the discovery reports to the monitoring agent server 156.

The example monitoring agent server 156 receives the discovery reports from the monitoring agents 158. If the monitoring agents 158 and the monitoring agent server 156 use a format different from a format used by the virtual infrastructure navigator 108 (e.g., different from a format used by the CU analyzer 138), the example monitoring agent server 156 parses the configuration items from a discovery report format to a format used by the virtual infrastructure navigator 108. The monitoring agent server 156 provides the configuration information associated with the example physical machines 154 to the virtual infrastructure navigator 108. In some examples, the monitoring agent server 156 further includes information identifying the physical machine 154 on which the configuration items were discovered prior to providing the configuration information to the CU analyzer 138 of the virtual infrastructure navigator 108. In some other examples, the monitoring agent server 156 instructions the monitoring agents 158 to transmit the discovery reports directly to the virtual infrastructure navigator 108.

The example CU analyzer 138 of FIG. 1 identifies customized configurations (e.g., configuration items) for the identified CUs (e.g., VMs 114 and/or physical machines 154) implementing the application 102. For example, the CU analyzer 138 selects for analysis the CUs 114, 154 that were identified by the service analyzer 136 and/or by the monitoring agent server 156, defined in the application definition 148, and/or stored in the application configuration database 144. To analyze the example CUs 114, 154, the example CU analyzer 138 of FIG. 1 selects and/or accesses discovery script(s) stored in the discovery script repository 146 and/or obtains discovery reports from the monitoring agent server 156 containing configuration information for the CUs 114, 154 having monitoring agents 158.

In the illustrated example, discovery scripts execute on the CU analyzer 138 and/or on the VMs 114 (e.g., using administrator credentials for the VMs 114) to discover configuration items of the VMs 114. For example, the CU analyzer 138 of FIG. 1 may execute the discovery script(s) to access the VM 114 via an interface (e.g., a command and/or text-based interface), through which the CU analyzer 138 may request and receive access to data elements (e.g., configurable items) of the VM 114. In some other examples, the CU analyzer 138 may transfer the discovery script(s) to the VM 114 for execution. The CU analyzer 138 of the illustrated example receives the configurations from the VM 114 (e.g., from communications by the executing discovery script(s)). The example CU analyzer 138 of FIG. 1 stores discovered configuration items in the application configuration database 144. In some examples, the CU analyzer 138 requests and/or executes a first discovery script in the discovery script repository 146, which results in calling additional discovery scripts based on the discovered configurations of the VMs 114.

In the example of FIG. 1, the CU analyzer 138 stores the discovered properties and configurations in association with data for respective ones of the CUs 114, 154 such that the CUs 114, 154 can be deployed by the application director 106 with the same respective configurations and/or properties to deploy a functionally identical version of the application 102.

In some examples, the discovery script(s) used by the service analyzer 136 to analyze and determine the application definition 148 are different than discovery script(s) used by the CU analyzer 138 to determine configurations of the CUs 114, 154 for generating the application blueprint 127. For example, the service analyzer 136 calls a first discovery script to determine the application definition based on identification of a seed VM 114, and the CU analyzer 138 calls a second discovery script to obtain the configurations of the VMs 114 when the application definition 148 is generated (e.g., via running the first discovery script) and/or when the application definition is determined from an application service package (e.g., a WAR file).

The example application blueprint generator 140 of FIG. 1 generates the application blueprint 127 based on the identified configurations of the CUs 114, 154 implementing the application 102. The application blueprint generator 140 of FIG. 1 converts or translates the configuration items (e.g., configurable data elements in the CUs 114, 154) to properties (e.g., variables to be used by scripts to set parameters on a script and run various configurations during deployment) for inclusion in the application blueprint 127. The example application blueprint generator 140 generates the application blueprint 127 to be substantially identical to an application blueprint that would be generated manually by an administrator 116 or developer 118 by selecting logical templates and/or customizing properties via the topology generator 120.

In the example of FIG. 1, the application blueprint generator 140 accesses the application configuration database 144 to select a CU 114, 154 that was analyzed by the CU analyzer 138. The example application blueprint generator 140 of the illustrated example determines logical template(s) that may be used to implement the selected CU 114, 154 and/or services executing on the selected CU 114, 154 as part of the application 102. The example application blueprint generator 140 of FIG. 1 populates the blueprint 126 with the selected template(s). The application blueprint generator 140 then determines customized properties based on the discovered configuration items of the CU 114, 154 (e.g., configuration items stored in the application configuration database 144 by the CU analyzer 138) and applies the same and/or corresponding customized properties to the respective application components (e.g., logical templates) in the blueprint 126. When the application components (e.g., logical templates) have been customized by the example application blueprint generator 140 of the illustrated example, the example application components in the blueprint 126 are configured such that the example application director 106 may deploy a VM 115 (and/or a physical machine) in the managed application 103 to provide the same components and/or services of the application 102 as the CU 114, 154 that was analyzed by the CU analyzer 138.

In the example of FIG. 1, the example CU analyzer 138 identifies any customized configuration elements of the CUs 114, 154 that may be implemented manually via the topology generator 120. Example configuration elements that may be discovered by the CU analyzer 138 (e.g., via the discovery scripts) and/or by parsing discovery reports from the monitoring agents 158 via the monitoring agent server 156 and may be implemented in the blueprint 126 include: dependencies between the CUs 114, 154, services, and/or other application components in the application 102; node cluster definitions; load balancing; port configurations; ciphers; custom drivers; and/or limits on simultaneous executing threads. However, the example CU analyzer 138 and/or the monitoring agent server 156 may execute the discovery scripts to discover any other customized application configuration elements. For example, the CU analyzer 138 and/or the monitoring agent server 156 may execute the discovery scripts to discover configurations stored on the CU 114, 154 in files, operating system registry keys, and/or any other source for implementing customized application configurations. When the application blueprint generator 140 of the illustrated example has processed each of the CUs 114, 154 analyzed by the CU analyzer 138, the example application blueprint 127 of FIG. 1 is representative of the customized application 102 of FIG. 1, including configurations of the CUs 114, 154, and may be deployed by the application director 106 to a deployment environment 112 as a managed application 103.

Figure 2A:
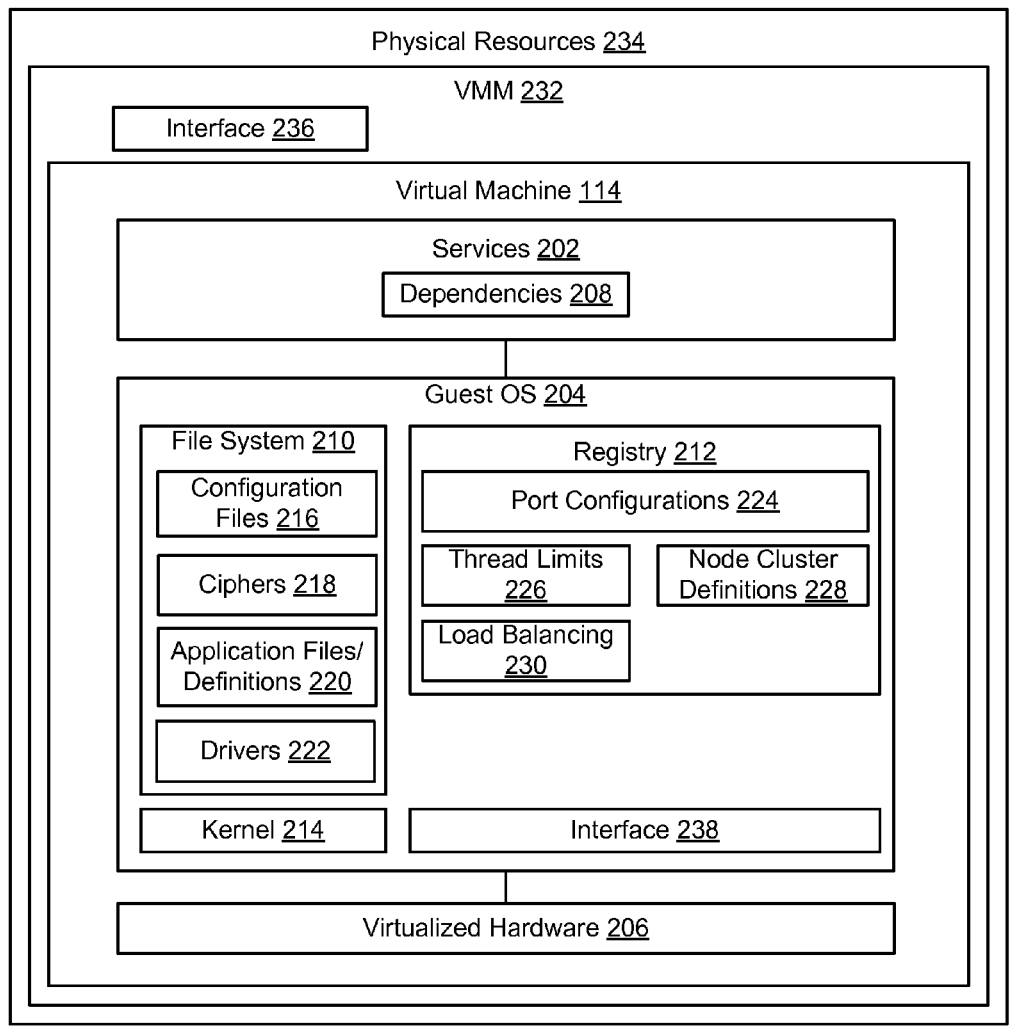
FIG. 2A is a block diagram of an example virtual machine (VM) that may be analyzed by the example system of FIG. 1 to create a customized application blueprint.

FIG. 2A is a block diagram of an example implementation of the VM 114 of FIG. 1. The example VM 114 of FIG. 2A may be analyzed by the example system 100 of FIG. 1 (e.g., via the CU analyzer 138 and/or discovery scripts) to create a customized application blueprint 127. The example VM 114 executes a set of services 202 and a guest OS 204 on virtualized hardware 206.

The example services 202 of FIG. 2A may include one or more dependencies 208 (e.g., dependencies on other services, dependencies on services executing on other VMs in the application, etc.). The dependencies 208 may include, for example, input data and/or confirmation of performance of another task prior to execution of a task by the services 202.

The example guest OS 204 of FIG. 2A includes a file system 210, a registry 212, and a kernel 214. The example file system 210 includes configuration files 216, ciphers 218, application files/definitions 220, and custom drivers 222. The example registry 212 of FIG. 2A includes communication port configurations 224, thread limits 226, node cluster definitions 228, and load balancing settings 230. However, the example configuration items 216-230 may be included in and/or divided among any of the virtual components 202-206, 210-214.

To identify properties of the example VM 114, the example CU analyzer 138 of FIG. 1 accesses a virtual machine manager (VMM) 232 that manages the execution of the VM 114 (and other VMs) on physical resources 234. In some examples, the CU analyzer 138 is provided with credentials (e.g., a user name and password of a user or administrator authorized to access the relevant portions of the VM 114) to access the components and/or properties 202-230 via a communications interface 236 of the VMM 232 and/or a communications interface 238 of the VM 114 (e.g., when the VM 114 is executing on the physical resources 234. For example, the CU analyzer 138 may issue text-based commands to the VM 114 to access data from the file system 210, the registry 212, and/or the kernel 214.

The example file system 210, the example registry 212, the example kernel 214, the example configuration files 216, the example ciphers 218, the example application files/definitions 220, the example custom drivers 222, the example communication port configurations 224, the example thread limits 226, the example node cluster definitions 228, and the example load balancing settings 230 of FIG. 2A are virtualized components. In some examples, the CU analyzer 138 (e.g., via executing discovery scripts) accesses data representative of the VM 114 (e.g., a stored VM file, a VM suspended state or snapshot state file, a virtual memory file, etc.) to identify the properties from the VM components 202-230. The example VM 114 may access the data representative of the VM 114 via the VMM 232 (e.g., via the interface 236) and/or via the physical resources 234 (e.g., in a physical storage device or memory).

Figure 2B:
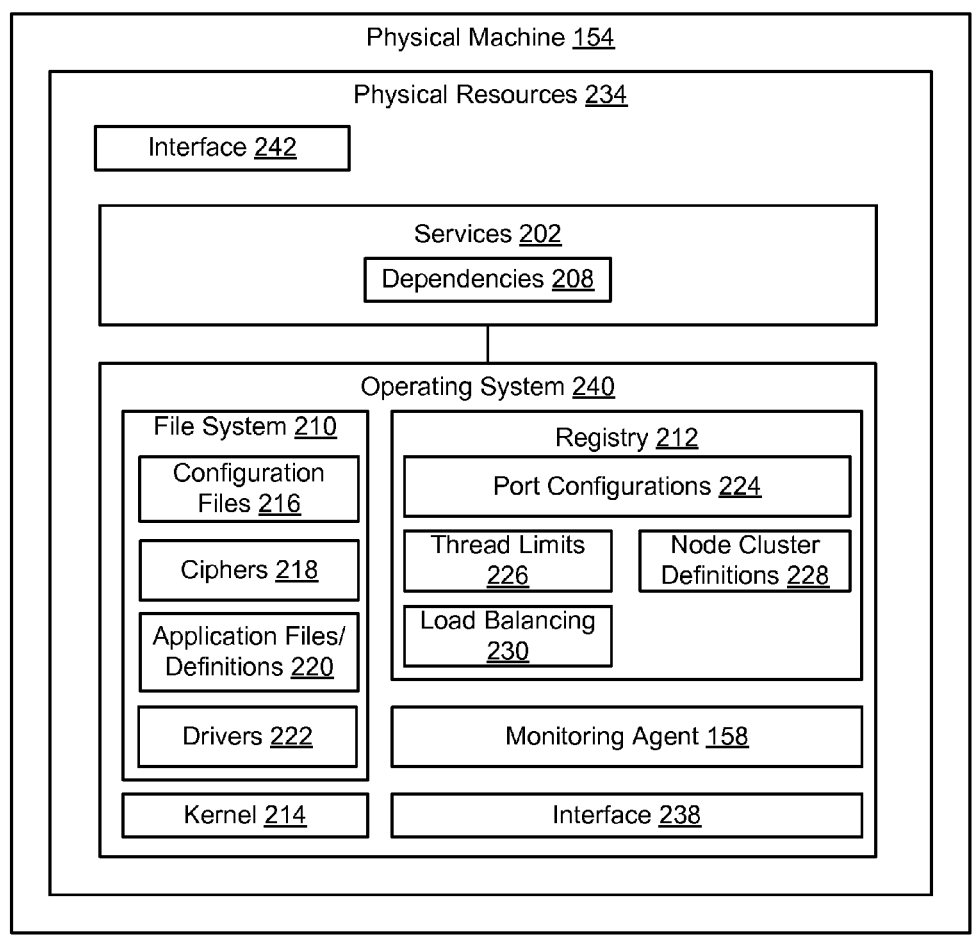
FIG. 2B is a block diagram of an example physical machine that may be analyzed by the example system of FIG. 1 to create a customized application blueprint.

FIG. 2B is a block diagram of an example implementation of the physical machine 154 of FIG. 1. The example physical machine 154 of FIG. 2B may be analyzed by the example system 100 of FIG. 1 to create a customized application blueprint 127.

The example physical machine 154 of FIG. 2B includes physical resources 234 to execute services 202 and an operating system 240. The example services 202 include dependencies 208.

The example operating system 240 of FIG. 2B includes a file system 210, a registry 212, a kernel 214, a communications interface 238, and a monitoring agent 158. The example file system 210 of FIG. 2B includes configuration files 216, ciphers 218, application files/definitions 220, and/or drivers 222. The example registry 212 of FIG. 2B includes port configurations 224, thread limits 226, node cluster definitions 228, and/or load balancing settings 230. The details of the example file system 210, the example registry 212, the example kernel 214, the example configuration files 216, the example ciphers 218, the example application files/definitions 220, the example drivers 222, the example port configurations 224, the example thread limits 226, the example node cluster definitions 228, the example load balancing settings 230, and the communications interface 238 are described above with reference to FIG. 2A, and are not reproduced to avoid repeated description.

To identify properties of the example physical machine 154, the example CU analyzer 138 of FIG. 1 accesses the monitoring agent 158 via the interface 242 of the physical machine 234 and/or the interface 238 of the operating system 240. In some examples, the monitoring agent 158 is installed on the physical machine 154 and executed on the physical resources 234 to access the components and/or properties 202, 208-230 via the communications interface 238 of the operating system 240 and/or the interface 242 of the physical machine 154. For example, the CU analyzer 138 may issue text-based commands to the physical machine 154 and/or the monitoring agent 158 to access data from the file system 210, the registry 212, and/or the kernel 214.

The example physical resources 234 of FIG. 2B further include a communications interface 242. The example communications interface 242 of FIG. 2B includes one or more physical and/or virtual ports. The example monitoring agent 158 receives commands and/or requests, and/or provides information to the monitoring agent server 158 via the interfaces 238 and/or 242.

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example service analyzer 136, the example CU analyzer 138, the example application blueprint generator 140, the example application definition generator 142, the example application configuration database 144, the example discovery script repository 146, the example application definition 148, the example physical machines 154, the example monitoring agent server 156, the example monitoring agents 158 and/or, more generally, the example system 100 of FIG. 1 may be implemented by hardware, software, firmware and/or any combination of hardware, software and/or firmware. Thus, for example, any of the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example service analyzer 136, the example CU analyzer 138, the example application blueprint generator 140, the example application definition generator 142, the example application configuration database 144, the example discovery script repository 146, the example application definition 148, the example physical machines 154, the example monitoring agent server 156, the example monitoring agents 158 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application 102, the example deployment environment 104, the example application director 106, the example virtual infrastructure navigator 108, the example cloud provider 110, the example deployment environments 112, the example VMs 114, the example topology generator 120, the example deployment plan generator 122, the example deployment director 124, the example blueprints 126, 127, the example deployment plans 128, the example catalog 130, the example cloud interface 132, the example central package repository 134, the example service analyzer 136, the example CU analyzer 138, the example application blueprint generator 140, the example application definition generator 142, the example application configuration database 144, the example discovery script repository 146, the example application definition 148, the example physical machines 154, the example monitoring agent server 156, and/or the example monitoring agents 158 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the system 100 of FIG. 1 is shown in FIGS. 3, 4, 5, 6, and/or 7. In this example, the machine readable instructions comprise programs for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowchart illustrated in FIGS. 3-7, many other methods of implementing the example system 100 may alternatively be used. For example, the order of execution of the blocks may be changed, and/or some of the blocks described may be changed, eliminated, or combined.

As mentioned above, the example processes of FIGS. 3-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 3:
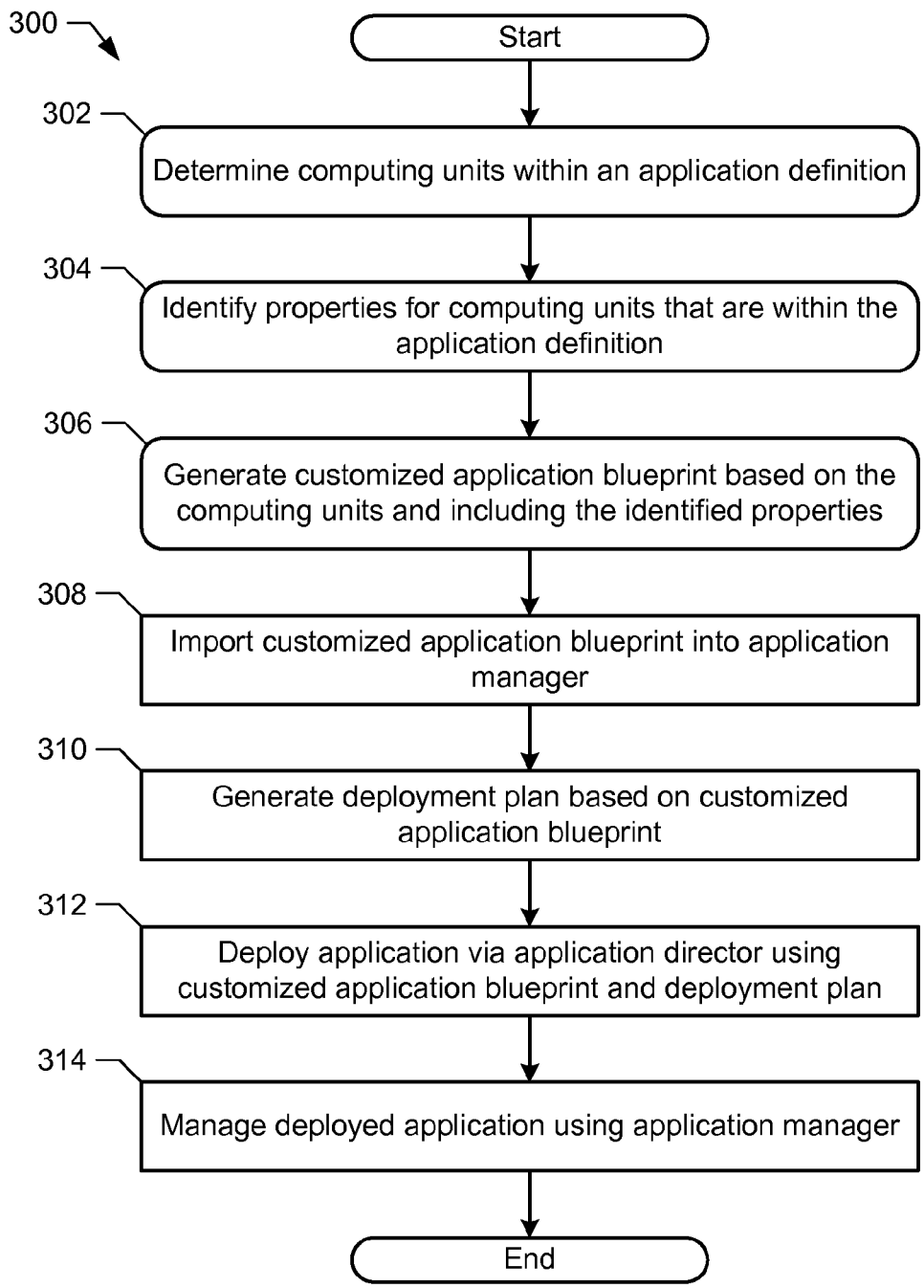
FIG. 3 is a flowchart representative of example machine readable instructions which may be executed to implement the example system of FIG. 1 to generate and deploy a customized application blueprint.

FIG. 3 is a flowchart representative of example machine readable instructions 300 which may be executed to implement the example system 100 of FIG. 1 to generate and deploy a customized application blueprint 127.

The example instructions 300 of FIG. 3 begin by determining CUs (e.g., the VMs 114 and/or the physical machines 154 of FIG. 1) within an application definition of the application 102 (e.g., the application definition 148 of FIG. 1) (block 302). For example, the service analyzer 136 may identify the CUs 114, 154 that implement the application 102 of FIG. 1 by analyzing one or more of the CUs 114, 154 and/or based on an application service package. Example instructions to implement block 302 are described below with reference to FIG. 4.

The example CU analyzer 138 identifies properties for the CUs 114, 154 that are within the application definition 148 (block 304). For example, the CU analyzer 138 may access and execute discovery scripts stored in the discovery script repository 146 of FIG. 1 to identify configurations of the VMs 114 of the application 102. In some examples, the CU analyzer 138 obtains discovery reports from the monitoring agent server 156 and/or from the monitoring agents 158. The example application blueprint generator 140 converts or translates the configurations (e.g., configuration items) to properties. Example configuration items that may be discovered by the example CU analyzer 138 include middleware settings stored in files, operating system registry keys, and/or any other source(s) for implementing customized application configurations. Example configuration items include: dependencies between CUs, services, and/or other application components in the application; node cluster definitions; load balancing; port configurations; ciphers; custom drivers; and/or limits on simultaneous executing threads.

The example CU analyzer 138 may discover the properties for the VMs 114 by, for example, executing the discovery script(s) to access the VMs 114 while they are executing on physical resources (e.g., the physical resources 234 of FIG. 2A) and/or to access data representative of the VMs 114 while the VMs 114 are not executing (e.g., while the VMs 114 are suspended). The example CU analyzer 138 may additionally or alternatively discover properties for the CUs 114, 154 by parsing discovery reports generated by the monitoring agents 158 (e.g., in a predetermined or designated format) to identify configuration settings of interest or relevant configuration settings for the application 102. Example instructions to implement block 304 are described below with reference to FIG. 5.

The example application blueprint generator 140 of FIG. 1 generates a customized application blueprint 127 based on the CUs 114, 154 and including the properties identified by the example CU analyzer 138 (block 306). For example, the application blueprint generator 140 may populate the customized application blueprint 127 using logical templates (e.g., from the catalog 130 of FIG. 1) based on the services provided by corresponding ones of the CUs 114, 154. The example application blueprint generator 140 then customizes the logical templates using the identified properties to copy the functionality of the CUs 114, 154 that implement the application 102. Example instructions to implement block 306 are described below with reference to FIG. 6.

The example application director 106 of FIG. 1 imports the customized application blueprint 127 (block 308). For example, the application director 106 may load a WAR file or other type of application blueprint file. The example deployment plan generator 122 generates a deployment plan (e.g., the deployment plan(s) 128 of FIG. 1) based on the customized application blueprint (block 310). The example deployment director 124 deploys the application 103 in a managed deployment environment (e.g., the deployment environments 112 of FIG. 1) using the customized application blueprint 127 and the deployment plan(s) 128. The example deployment director 124 manages the deployed application 103. For example, the administrator 116 of FIG. 1 may monitor and/or modify the deployed application 103 via the deployment director 124. The example instructions 300 then end. In some examples, management of the deployed application in block 314 may be ongoing after application 103 has been deployed via the deployment director 124.

Figure 4:
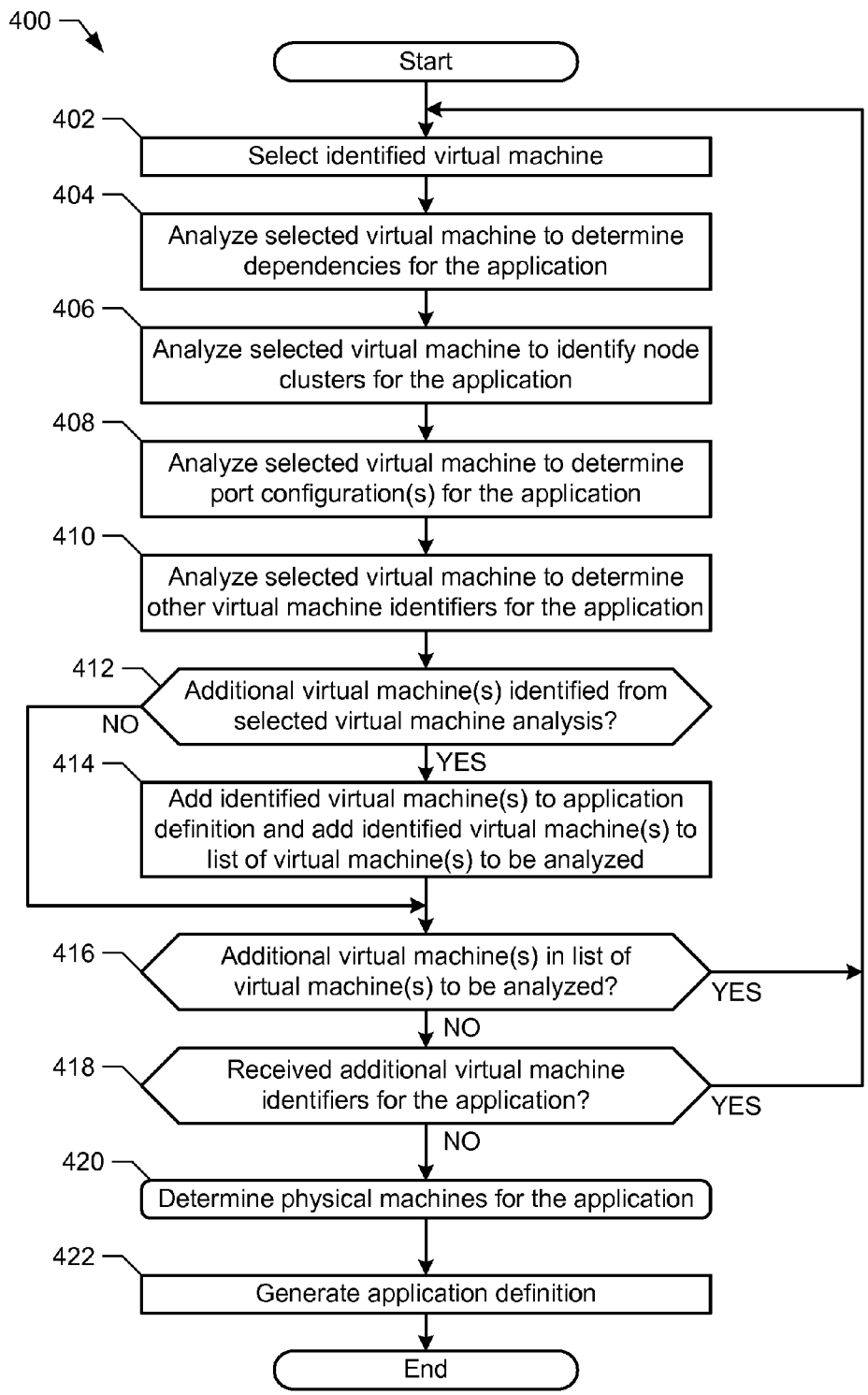
FIG. 4 is a flowchart representative of example machine readable instructions which may be executed to implement the example service analyzer of FIG. 1 to determine computing units (CUs) in an application definition.

FIG. 4 is a flowchart representative of example machine readable instructions 400 which may be executed to implement the example service analyzer 136 of FIG. 1 to determine CUs in an application definition. The example instructions 400 of FIG. 4 may be executed to implement block 302 of FIG. 3.

The example service analyzer 136 of FIG. 1 selects an identified VM 114 (block 402). For example, the service analyzer 136 may be provided with an identification (e.g., the VIN ID/IP address 150 of FIG. 1) of a first VM 114 in the application 102 (e.g., implementing the application 102) as a seed VM.

The example service analyzer 136 analyzes the selected VM 114 to determine dependencies for the application 102 (block 404). For example, the service analyzer 136 may determine other service(s) and/or VMs 114 on which services operating on the selected VM 114 depend.

The example service analyzer 136 analyzes the selected VM 114 to identify node clusters for the application (block 406). For example, the selected VM 114 may be configured in a cluster of VMs 114 that are part of the application 102.

The example service analyzer 136 of FIG. 1 analyzes the selected VM 114 to determine port configuration(s) for the application (block 408). For example, the VMs 114 implementing the application 102 may be configured to communicate with other ones of the VMs 114 at different IP addresses via designated ports. By identifying the port configuration(s), the example service analyzer 136 may obtain the IP addresses and/or identifiers of other VMs 114 that implement the application 102.

The example service analyzer 136 of FIG. 1 analyzes the selected VM 114 to determine other VM identifiers for the application 102 (block 410). For example, the service analyzer 136 may analyze any other configuration items of the VMs 114 that implement the application 102 from which additional VMs 114 that implement the application 102 may be identified.

The example service analyzer 136 of FIG. 1 determines whether additional VMs 114 have been identified from analysis of the selected VM (block 412). If VMs have been identified (block 412), the example service analyzer 136 adds any identified (e.g., newly-identified) VMs 114 to a list of VMs to be analyzed (block 414). The list of VMs to be analyzed may be used by the example service analyzer 136 to identify further VMs 114 that implement the application 102 and/or by the CU analyzer 138 of FIG. 1 to identify the configurations of the VMs 114.

After adding identified VMs 114 to the list (block 414), or if no additional VMs have been identified by analyzing the selected VM (block 412), the example service analyzer 136 determines whether additional VMs in the list of VMs are to be analyzed (block 416). If there are no additional VMs to be analyzed by the service analyzer 136 (block 416), the example service analyzer 136 determines whether another VM identifier (e.g., another VM seed) has been received for the application 102 (block 418). For example, if there are additional VMs 114 implementing the application 102 that were not identified by the service analyzer 136 by analyzing a first seed VM 114, the example administrator 116 (or another user) may seed an additional VM identifier to the service analyzer 136 to continue identifying the VMs 114 that implement the application 102. If there are additional VMs 114 in the list (block 416) or if another VM identifier has been received (block 418), control returns to block 402 to select another VM 114 (e.g., from the list or based on a received VM seed).

When there are no additional VMs 114 in the list (block 416) and another VM identifier has not been received (block 418), the example application definition generator 142 of FIG. 1 determines physical machines (e.g., the physical machines 154 of FIG. 1) in the application definition (block 420). For example, the application definition generator 142 may instruct the monitoring agent server 156 of FIG. 1 to identify (via the monitoring agents 158) configuration items on the physical machines 154 indicating that the physical machines 154 are part of the application 102 (e.g., that the physical machines 154 implement the application). Example instructions to implement block 420 are described below with reference to FIG. 7. In some examples, block 420 may be performed prior to or in parallel with blocks 402-418 of FIG. 4.

After the application definition generator 142 determines the physical machines in the application (block 420), the example application definition generator 142 generates an application definition 148 (block 422). For example, the application definition generator 142 may generate the application definition 148 for the application 102 based on a list of VMs identified by the service analyzer 136 and VMs seeded to the example service analyzer 136. The example instructions 400 then end and control returns to block 304 of FIG. 3.

Figure 5:
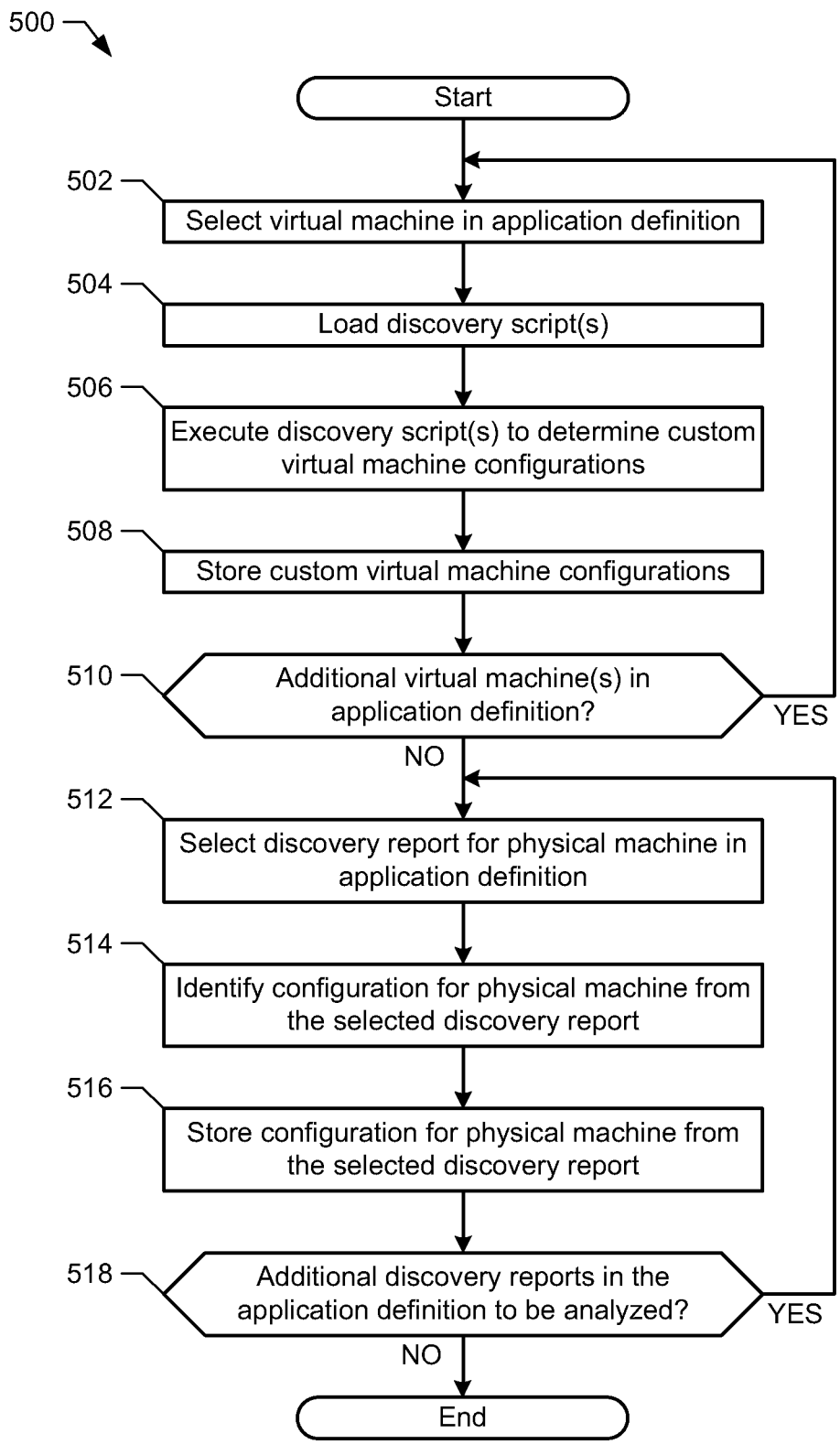
FIG. 5 is a flowchart representative of example machine readable instructions which may be executed to implement the example CU analyzer of FIGS. 1 and/or 2 to identify properties for CUs that are within an application definition.

FIG. 5 is a flowchart representative of example machine readable instructions 500 which may be executed to implement the example CU analyzer 138 of FIG. 1 to identify properties for VMs 114 that are within an application definition 148. The example instructions 500 of FIG. 5 may be executed to implement block 304 of FIG. 3. The example instructions 500 begin when an application definition 148 has been obtained (e.g., received and/or generated).

The example CU analyzer 138 of FIG. 1 selects a VM in the application definition 148 (block 502). For example, the application definition 148 may list identifiers, URLs, URIs, and/or any other uniquely identifying information for the VMs 114 that implement the application 102 of FIG. 1. The example CU analyzer 138 loads discovery scripts (block 504). For example, the CU analyzer 138 may access the discovery script repository 146 of FIG. 1 to load one or more discovery scripts, which in turn may call additional discovery scripts during execution by the CU analyzer 138. In some examples, the CU analyzer 138 loads a discovery script based on a type or function of the selected VM 114.

The example CU analyzer 138 of FIG. 1 executes the discovery script(s) to determine custom VM configurations (block 506). For example, the CU analyzer 138 may execute the discovery script(s) to access the example file system 210, the example registry 212, and/or the example kernel 214 to identify configuration files 216, ciphers 218, application files/definitions 220, custom drivers 222, communication port configurations 224, thread limits 226, node cluster definitions 228, load balancing settings 230, and/or other properties of the VM 114. For example, the discovery script may be executed to access the interface 238 of the VM 114 and/or the interface 236 of the VMM 232 of FIG. 2A. In some other examples, the CU analyzer 138 loads the discovery scripts onto the selected VM 114 and/or the VMM 232 of FIG. 2A to discover and provide the configurations to the CU analyzer 138. The example CU analyzer 138 stores the identified custom VM configurations (e.g., configuration items) (block 508). For example, the CU analyzer 138 may store the VM properties in the example application configuration database 144.

The example CU analyzer 138 determines whether there are additional VMs 114 in the application definition 148 to be analyzed (block 510). If there are additional VMs 114 to be analyzed (block 510), control returns to block 502 to select another VM 114. When there are no more VMs 114 to be analyzed for custom configurations (block 510), the example CU analyzer 138 selects a discovery report for a physical machine (e.g., one of the physical machines 154 of FIG. 1) in the application definition (block 512). For example, the CU analyzer 138 may select a discovery report for a physical machine 154 identified as being a part of the application 102 (e.g., identified as implementing the application 102) based on performing the instructions 400 of FIG. 4 and/or the instructions 700 of FIG. 7.

The CU analyzer 138 identifies a configuration for the physical machine 154 from the selected discovery report (block 514). For example, the CU analyzer 138 may parse the discovery report for configuration items of interest and/or items that are relevant to the application. The CU analyzer 138 stores the configuration for the physical machine 154 that are identified from the selected discovery report (block 516). The example CU analyzer 138 determines whether there are additional discovery reports in the application definition 148 to be analyzed (block 518). If there are additional discovery reports to be analyzed (block 518), control returns to block 512 to select another discovery reports. When there are no more discovery reports to be analyzed for custom configurations (block 518), the example instructions 500 of FIG. 5 end and control returns to block 306 of FIG. 3.

Figure 6:
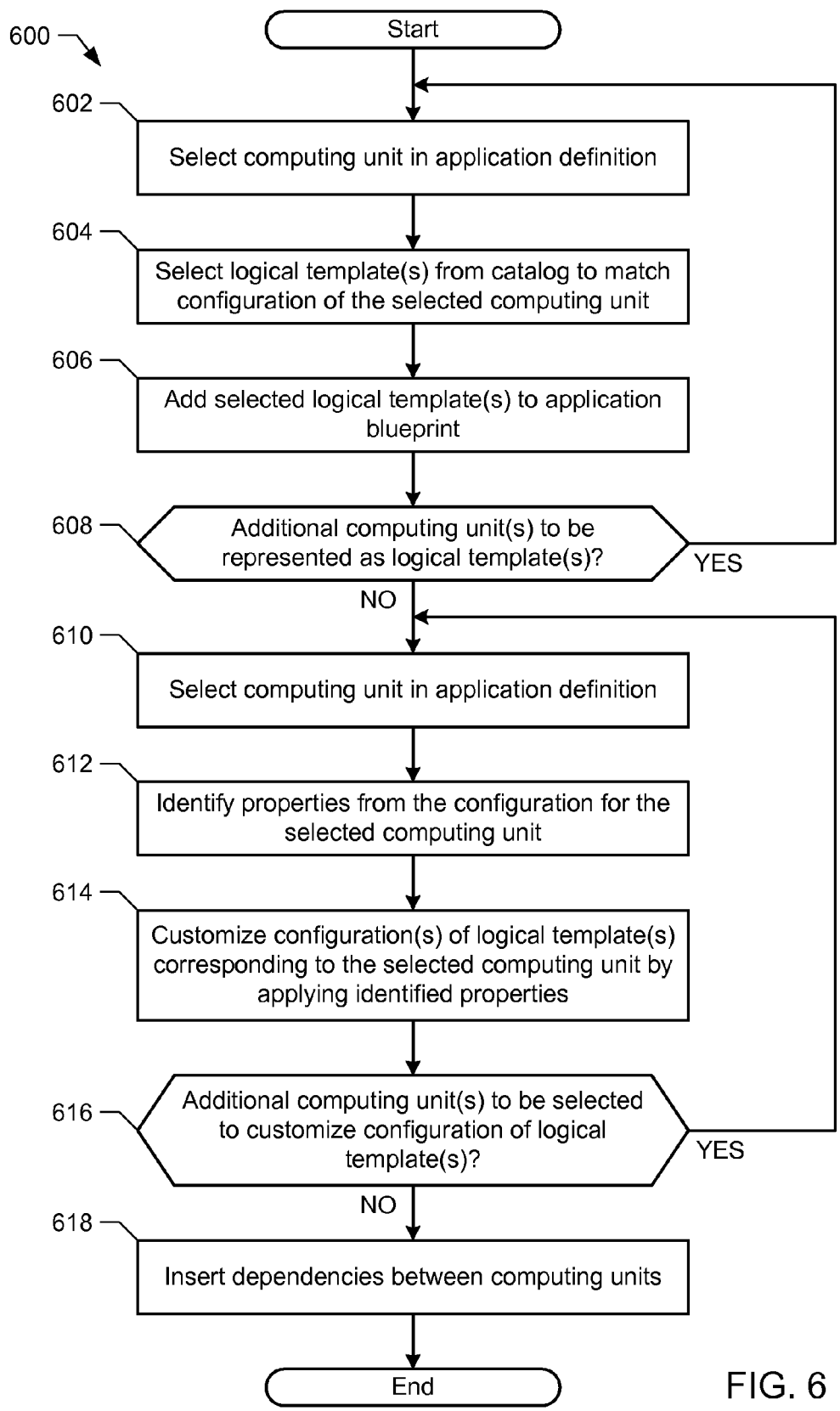
FIG. 6 is a flowchart representative of example machine readable instructions which may be executed to implement the example application blueprint generator of FIGS. 1 and/or 2 to generate a customized application blueprint.

FIG. 6 is a flowchart representative of example machine readable instructions 600 which may be executed to implement the example application blueprint generator 140 of FIG. 1 to generate a customized application blueprint 127. The example instructions 600 of FIG. 6 may be executed to implement block 306 of FIG. 3.

The example application blueprint generator 140 of FIG. 1 selects a CU (e.g., a VM 114, a physical machine 154) in the application definition (block 602). The application blueprint generator 140 selects a logical template from a catalog (e.g., the catalog 130 of FIG. 1) to match the configuration of the selected CU 114, 154 (block 604). For example, the application blueprint generator 140 selects one or more logical templates from the catalog 130 to represent the services, operating systems, and/or hardware associated with the selected CU 114, 154 (e.g., the services 202 of FIG. 2A). In the example block 604, the example application blueprint generator 140 matches an unmodified or out-of-the-box version of the service(s) 202, guest OS 204, and/or virtual hardware 206 identified for the selected CU 114, 154. The unmodified or out-of-the-box versions may be stored in the example application configuration database 144 of FIG. 1 by the example CU analyzer 138. For example, the CU analyzer 138 may identify and store type(s) and/or version(s) of the service(s) 202, guest OS 204, and/or physical hardware 206 of FIG. 2A in addition to identifying customized configurations of the example CU 114, 154.

The example application blueprint generator 140 adds the selected logical template(s) to the application blueprint 127 (block 606). For example, the application blueprint generator 140 may add the logical templates to a container or other data structure representative of a CU 114, 154 to be included in a deployment of the application 102.

The example application blueprint generator 140 determines whether additional CU(s) are to be represented as logical template(s) (block 608). If additional CUs are to be represented as logical template(s) (block 608), control returns to block 602 to select another CU in the application definition 148.

When each of the example CUs have been represented in the application blueprint 127 as logical template(s) (block 608), the example application blueprint generator 140 re-processes each of the CU 114, 154 in the application definition 148 to customize the properties of the VMs 115 in the application blueprint 127 based on the discovered configurations (e.g., configuration items, configuration settings, etc.) of the CU 114, 154. The example application blueprint generator 140 selects a CU in the application definition (block 610). The CU 114, 154 selected in block 610 is a CU 114, 154 that was previously selected during an iteration of block 602.

The example application blueprint generator 140 identifies properties for the selected CU 114, 154 based on the configuration of the CU 114, 154 (block 612). For example, the application blueprint generator 140 may convert configuration items identified by the example CU analyzer 138 for the selected CU 114, 154 to properties to be used by the application director 106 when deploying the application 103 and the VMs 115. The application blueprint generator 140 of the illustrated example customizes the configuration(s) (e.g., properties) of the logical template(s) (e.g., application components) in the blueprint 127 corresponding to the selected CU 114, 154 by applying the identified (e.g., resulting) properties (block 614). For example, the application blueprint generator 140 of FIG. 1 modifies the logical template(s) for the selected CU 114, 154 by modifying the example file system 210, the example registry 212, the example kernel 214 to customize configuration files 216, ciphers 218, application files/definitions 220, custom drivers 222, communication port configurations 224, thread limits 226, node cluster definitions 228, load balancing settings 230, and/or other properties of the logical templates and/or application components for the selected CU 114, 154. The resulting application components provide identical or substantially identical services to the selected CU 114, 154.

The example application blueprint generator 140 of FIG. 1 determines whether additional CUs are to be selected to customize the configuration of the logical template(s) and/or application component(s) (block 616). If there are additional CUs to be selected to customize the appropriate logical template(s) and/or application component(s) (block 616), control returns to block 610 to select another CU 114, 154. When there are no more CUs to be selected (block 616), the example application blueprint generator 140 inserts any dependencies between the CUs 114, 154 that implement the application 102 (block 618). For example, the application blueprint generator 140 may wait to insert the dependencies until the application components corresponding to the CUs 114, 154 are customized with the appropriate properties. While the dependencies may be identified and/or stored using temporary identifiers of the analyzed CUs 114, 154, the example customized properties may result in modifying the identifiers of the example application components such that previously-configured dependencies may be broken.

Furthermore, some dependencies may be based on logical location(s) of the deployed CUs 114, 154 rather than identifiers of the CUs 114, 154. Accordingly, the example application blueprint generator 140 may generate a separate data structure in the application blueprint 127 that identifies the dependencies between application components in the blueprint 127. The example deployment plan generator 122 may generate the deployment plan 128 by converting the dependencies to logical locations. In some other examples, the application blueprint generator 140 inserts the dependencies during block 614 when customizing the configuration(s) of the logical templates (e.g., subsequent to adding logical template(s) and/or application components to the application blueprint). After inserting the dependencies (block 620), the example instructions 600 end and control returns to block 308 of FIG. 3.

Figure 7:
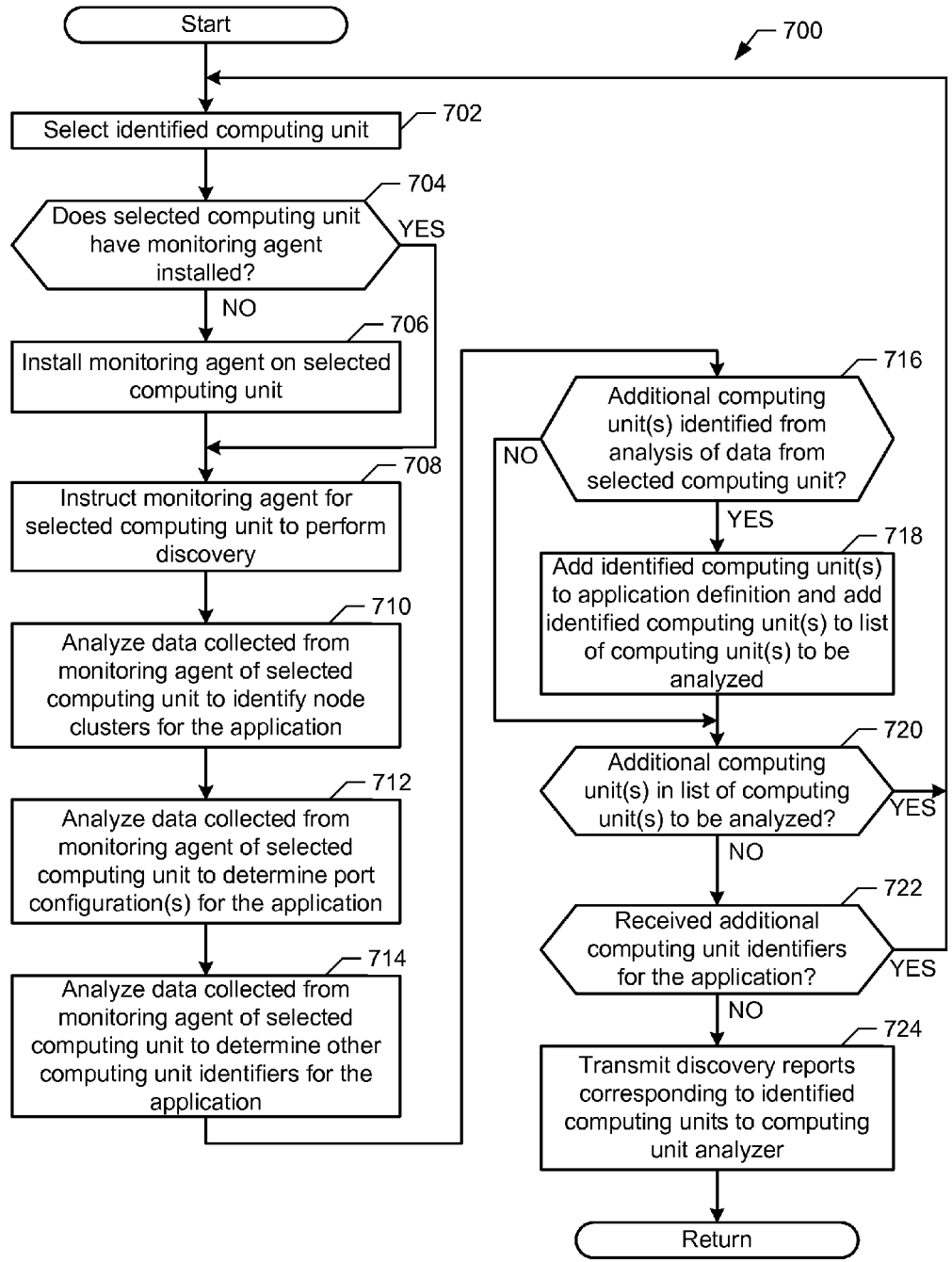
FIG. 7 is a flowchart representative of example machine readable instructions which may be executed to implement the example monitoring agent server of FIG. 1 to identify in an application and/or to generate discovery reports for the CUs.

FIG. 7 is a flowchart representative of example machine readable instructions 700 which may be executed to implement the example monitoring agent server 156 of FIG. 1 to identify CUs (e.g., the VMs 114, the physical machines 154) that implement an application (e.g., the application 102) and/or to generate discovery reports for the CUs. The example instructions 700 may be used to implement block 420 of FIG. 4.

The example monitoring agent server 156 of FIG. 1 selects an identified computing unit (e.g., one of the physical machines 154 or one of the VMs 114 of FIG. 1) (block 702). For example, the monitoring agent server 156 may be provided with an identification (e.g., the VIN ID/IP address 150 of FIG. 1) of a first physical machine 154 implementing the application 102 as a seed CU. Additionally or alternatively, the example monitoring agent server 156 may obtain an identifier of the first physical machine 154 based on identifying one or more of the VMs 114 via blocks 404-410, 414 of FIG. 4.

The monitoring agent server 156 of the illustrated example determines whether the selected CU 114, 154 has a monitoring agent installed (e.g., the monitoring agent 158 of FIG. 1) (block 704). If the selected CU 114, 154 does not have a monitoring agent 158 installed (block 704), the monitoring agent server 156 installs a monitoring agent on the selected computing unit (block 706). For example, the monitoring agent server 156 may provide an installation package or a pointer or link to the CU 114, 154 to enable the CU 114, 154 to install the monitoring agent.

After installing the monitoring agent (block 706), or if the monitoring agent was previously installed (block 704), the example monitoring agent server 156 instructs the monitoring agent 158 for the selected CU 114, 154 to perform discovery (block 708). For example, the monitoring agent server 156 may provide a discovery script to the monitoring agent 158 and/or instruct the monitoring agent 158 to execute a stored discovery script. Based on the instruction from the monitoring agent server 156, the monitoring agent 158 executes the discovery script to, for example, collect configuration information from the selected CU 114, 154 pertaining to node cluster configurations, port configuration(s), dependencies on other computing units, and/or any other configuration information associated with executing the application 102.

The example monitoring agent server 156 analyzes data collected from the monitoring agent 158 of the selected CU 114, 154 to identify node clusters for the application 102 (block 710). For example, a selected physical machine may be configured in a cluster of CUs 114, 154 that are part of the application 102.

The example monitoring agent server 156 also analyzes data collected from the monitoring agent 158 to determine port configuration(s) for the application 102 (block 712). For example, the CUs 114, 154 that implement the application 102 may be configured to communicate with other ones of the CUs 114, 154 at different IP addresses via designated ports. By identifying the port configuration(s), the example monitoring agent server 156 may obtain the IP addresses and/or identifiers of other CUs 114, 154 that implement the application 102.

The example monitoring agent server 156 further analyzes data collected from the monitoring agent 158 to determine other CU identifiers for the application 102 (block 714). For example, the monitoring agent server 156 of the illustrated example may analyze any other configuration items of the CUs 114, 154 that implement the application 102 from which additional CUs 114, 154 that implement the application 102 may be identified.

The example monitoring agent server 156 of FIG. 1 determines whether additional CUs 114, 154 have been identified from analysis of the selected CU 114, 154 (block 716). If CUs have been identified (block 716), the example monitoring agent server 156 adds any identified (e.g., newly-identified) CUs 114, 154 to the application definition and adds the identified CUs 114, 154 to a list of CUs to be analyzed (block 718). The list of CUs to be analyzed may be used by the example service analyzer 136 to identify further CUs 114, 154 that implement the application 102 and/or by the monitoring agent server 156 and/or the CU analyzer 138 of FIG. 1 to identify the configurations of the CUs 114, 154.

After adding identified CUs 114, 154 to the list (block 718), or if no additional CUs 114, 154 have been identified by analyzing the selected CU 114, 154 (block 716), the example monitoring agent server 156 determines whether additional CUs 114, 154 in the list of CUs 114, 154 are to be analyzed (block 720). If there are no additional CUs 114, 154 to be analyzed by the service analyzer 136 (block 416), the example monitoring agent server 156 determines whether another CU identifier (e.g., another CU seed) has been received for the application 102 (block 722). For example, if there are additional CUs 114, 154 implementing the application 102 that were not identified by the monitoring agent server 156 by analyzing a first seed CU 114, 154, the example administrator 116 (or another user) may seed an additional CU identifier to the service analyzer 136 to continue identifying the CUs 114, 154 that implement the application 102. If there are additional CUs 114, 154 in the list (block 720) or if another CU identifier has been received (block 722), control returns to block 702 to select another CU 114, 154 (e.g., from the list or based on a received CU seed).

When there are no additional CUs 114, 154 in the list (block 720) and another CU identifier has not been received (block 722), the example monitoring agent server 156 transmits the discovery reports for the identified CUs to the example CU analyzer 138 (block 724). The discovery reports for the CUs 114, 154 may be used to identify configuration items for the CUs 114, 154 that implement the application 102. The example instructions 700 of FIG. 7 then end and the monitoring agent server 156 of FIG. 1 returns control to the example application definition generator 142 at block 422 of FIG. 4 to generate the application definition.

Figure 8:
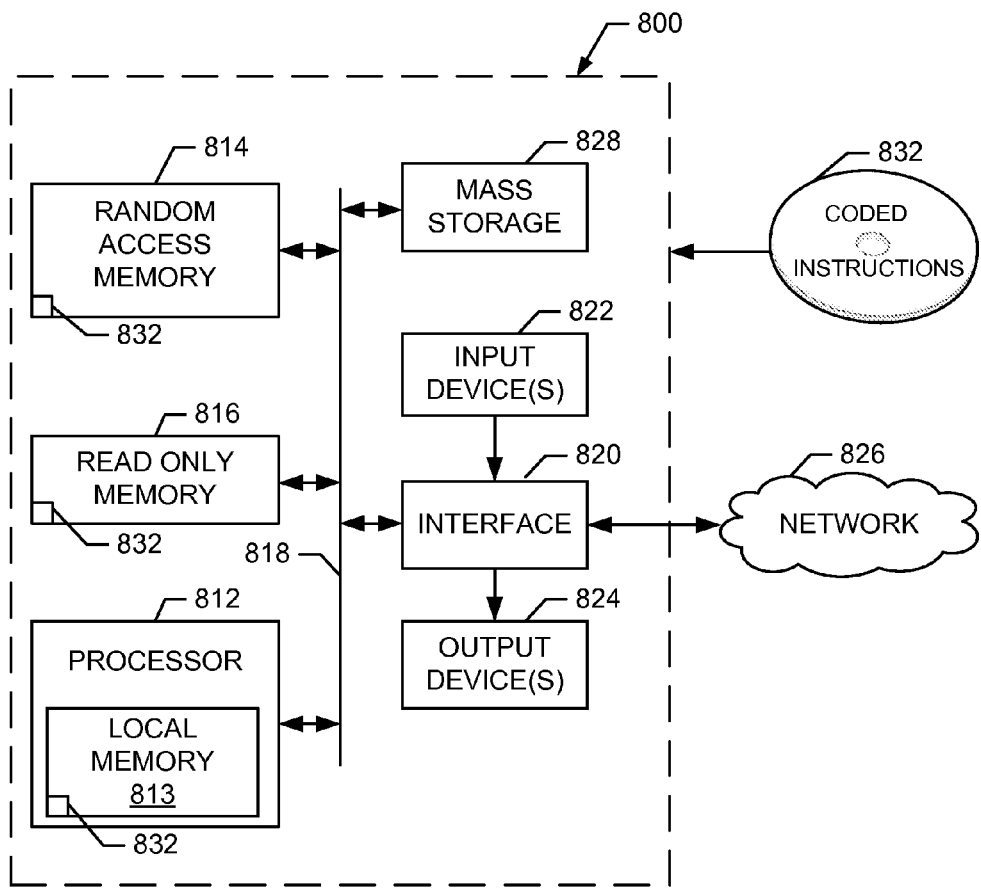
FIG. 8 is a block diagram of an example processor platform capable of executing the instructions of FIGS. 3, 4, 5, 6 and/or 7 to implement the system of FIG. 1.

FIG. 8 is a block diagram of an example processor platform 800 capable of executing the instructions of FIGS. 3, 4, 5, 6, and/or 7 to implement the application director 106 and/or the virtual infrastructure navigator 108 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 3-7 may be stored in the mass storage device 828, in the volatile memory 814, in the non-volatile memory 816, and/or on a removable tangible computer readable storage medium such as a CD or DVD.

As mentioned above, example methods and apparatus disclosed herein facilitate the automatic conversion of unmanaged customized applications including multiple VMs and/or physical machines to managed application deployments. Example methods and apparatus disclosed herein enable application deployments to the cloud in a manner that is faster, less expensive, and less prone to errors caused by manual entry of application properties. Furthermore, example methods and apparatus enable a more accurate analysis of the properties and configurations of CUs in an application by automating the CU analysis process, thereby enabling application deployments that accurately reflect the original, unmanaged application. The foregoing advantages enable enterprises to more readily take advantage of cloud computing and Infrastructure-as-a-Service to implement customized web applications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   generating, by executing an instruction with a processor, an application definition for an unmanaged application by identifying a first computing unit associated with the unmanaged application based on a configuration of a second computing unit;
   executing instructions with the processor to (1) automatically identify a first property for the first computing unit, (2) automatically identify a service provided by the first computing unit, and (3) automatically identify a second property of the first computing unit;
   selecting, by executing an instruction with the processor, a first logical template corresponding to the first computing unit based on the service provided by the first computing unit, the first logical template matching an unmodified version of the service;
   generating, by executing an instruction with the processor, an application blueprint including the first logical template;
   modifying, by executing an instruction with the processor, the first logical template included in the application blueprint based on the first property and the second property of the first computing unit;
   inserting, by executing an instruction with the processor, a dependency between the first logical template representative of the first computing unit and a second logical template representative of the second computing unit, the dependency based on logical locations of the computing units; and deploying, by executing an instruction with the processor, a managed application according to the application blueprint to implement the unmanaged application.

2. A method as defined in claim 1, wherein the first computing unit is a physical computing device or a virtual machine.

3. A method as defined in claim 2, wherein the deploying of the managed application includes deploying a third computing unit based on the application blueprint.

4. A method as defined in claim 3, wherein the third computing unit is a physical computing device or a virtual machine.

5. A method as defined in claim 1, wherein the identifying of the first property includes determining whether a monitoring agent is installed at the first computing unit and, when the monitoring agent is not installed, instructing the first computing unit to install the monitoring agent.

6. A method as defined in claim 1, wherein the identifying of the first property includes instructing a monitoring agent installed on the first computing unit to identify a configuration item at the first computing unit.

7. A method as defined in claim 6, wherein the configuration item includes at least one of: (a) a dependency between at least two of the first computing unit, the second computing unit, the service, or another application component in the application; (b) a node cluster definition; (c) a load balancing; (d) a port configuration; (e) a cipher; (f) a custom driver; or (g) a limit on simultaneous executing threads.

8. A method as defined in claim 7, wherein the identifying of the first property includes:
instructing the monitoring agent to provide a report including the configuration item; and
analyzing the report to identify the configuration item of the first computing unit.

9. A method as defined in claim 1, wherein the identifying of the first property for the first computing unit includes accessing a first interface of the first computing unit, and the identifying of the second property for the first computing unit includes accessing a second interface of the first computing unit.

10. An apparatus, comprising:
a service analyzer to:
identify a first computing unit associated with a first application definition; and
identify a second computing unit associated with an unmanaged application based on a configuration of the first computing unit;
an application definition generator to generate a second application definition for the unmanaged application based on the first computing unit and the second computing unit;
a computing unit analyzer to identify a first property for the second computing unit, to identify a service provided by the second computing unit, and to identify a second property of the second computing unit;
an application blueprint generator to:
select a first logical template to represent the service provided by the second computing unit, the first logical template to match an unmodified version of the service;
generate an application blueprint including the first logical template;
modify the first logical template included in the application blueprint based on the first property of the second computing unit and the second property of the second computing unit; and
insert a dependency between the first logical template representative of the second computing unit and a second logical template representative of the first computing unit, the dependency based on logical locations of the computing units; and
an application director to deploy a managed application according to the application blueprint to implement the unmanaged application,
at least one of the service analyzer, the application definition generator, the computing unit analyzer, the application blueprint generator, or the application director implemented by a logic circuit.

11. An apparatus as defined in claim 10, wherein the second computing unit is a physical computing device or a virtual machine.

12. An apparatus as defined in claim 11, wherein the computing unit analyzer is to identify the first property by determining whether a monitoring agent is installed at the second computing unit and, when the monitoring agent is not installed at the second computing unit, the computing unit analyzer is to instruct the second computing unit to install the monitoring agent.

13. An apparatus as defined in claim 10, further including a monitoring agent server to:
instruct a monitoring agent installed on the second computing unit to execute a discovery script to identify a configuration item at the second computing unit; and
provide the configuration item to the computing unit analyzer based on a report generated by the monitoring agent.

14. A tangible computer readable storage medium comprising machine readable instructions which, when executed, cause a logic circuit to at least:
generate an application definition for an unmanaged application by identifying a first computing unit associated with the unmanaged application based on a configuration of a second computing unit;
automatically identify a first property for the first computing unit;
automatically identify a service provided by the first computing unit;
automatically identify a second property of the first computing unit;
select a first logical template based on the service provided by the first computing unit, the first logical template to match an unmodified version of the service;
generate an application blueprint including the first logical template;
modify the first logical template included in the application blueprint based on the first property and the second property;
integrate the modified first logical template corresponding to the first computing unit into the application blueprint;
insert a dependency between the first logical template representative of the first computing unit and a second logical template representative of the second computing unit, the dependency based on logical locations of the computing units; and
deploy a managed application according to the application blueprint to replace the unmanaged application.

15. A storage medium as defined in claim 14, wherein the first computing unit is a physical computing device or a virtual machine.

16. A storage medium as defined in claim 15, wherein the instructions are to cause the logic circuit to deploy the managed application by deploying a third computing unit based on the application blueprint.

17. A storage medium as defined in claim 16, wherein the third computing unit is a physical computing device or a virtual machine.

18. A storage medium as defined in claim 14, wherein the instructions are to cause the logic circuit to identify the first property by determining whether a monitoring agent is installed at the first computing unit and, when the monitoring agent is not installed at the first computing unit, to instruct the first computing unit to install the monitoring agent.

19. A storage medium as defined in claim 14, wherein the instructions are to cause the logic circuit to identify the first property by instructing a monitoring agent installed on the first computing unit to execute a discovery script to identify a configuration item at the first computing unit.

20. A storage medium as defined in claim 19, wherein the configuration item includes at least one of: 1) dependency between a) computing units, b) the service, and c) another application component in the application; 2) a node cluster definition; 3) a load balancing; 4) a port configuration; 5) a cipher; 6) a custom driver; or 7) a limit on simultaneous executing threads.

21. A storage medium as defined in claim 20, wherein the instructions are to cause the logic circuit to identify the first property by:
  instructing the monitoring agent to provide a report including the configuration item; and
  analyzing the report to identify the configuration item of the first computing unit.

22. A method, comprising:
  identifying, by executing an instruction with a processor, a first computing unit associated with a first application definition;
  determining, by executing an instruction with the processor, whether a monitoring agent is installed at the first computing unit;
  when the agent is not installed, instructing, by executing an instruction with the processor, the first computing unit to install the monitoring agent;
  executing a script with the monitoring agent installed on the first computing unit to identify a port configuration at the first computing unit;
  identifying, by executing an instruction with the processor, a second computing unit based on the port configuration of the first computing unit;
  adding, by executing an instruction with the processor, the second computing unit to a same application definition as the first computing unit based on the identifying of the second computing unit;
  identifying, by executing an instruction with the processor, a first property for the first computing unit based on a first report obtained from the first computing unit;
  identifying, by executing an instruction with the processor, a second property for the second computing unit based on a second report obtained from the second computing unit;
  selecting, by executing an instruction with the processor, a first logical template corresponding to the first computing unit based on the first property, the first logical template matching an unmodified version of the first property;
  selecting, by executing an instruction with the processor, a second logical template corresponding to the second computing unit based on the second property, the second logical template matching an unmodified version of the second property;
  generating, by executing an instruction with the processor, an application blueprint including the first logical template and the second logical template;
  modifying, by executing an instruction with the processor, the first logical template based on the first property of the first computing unit and modifying the second logical template based on the second property of the second computing unit; and
  inserting, by executing an instruction with the processor, a dependency between the first logical template included in the application blueprint and the second logical template included in the application blueprint, the dependency based on logical locations of the first computing unit and the second computing unit.

* * * * *